July 25, 1939.  R. R. YANITS  2,167,599
CAR COUPLING TOOL
Filed April 4, 1939
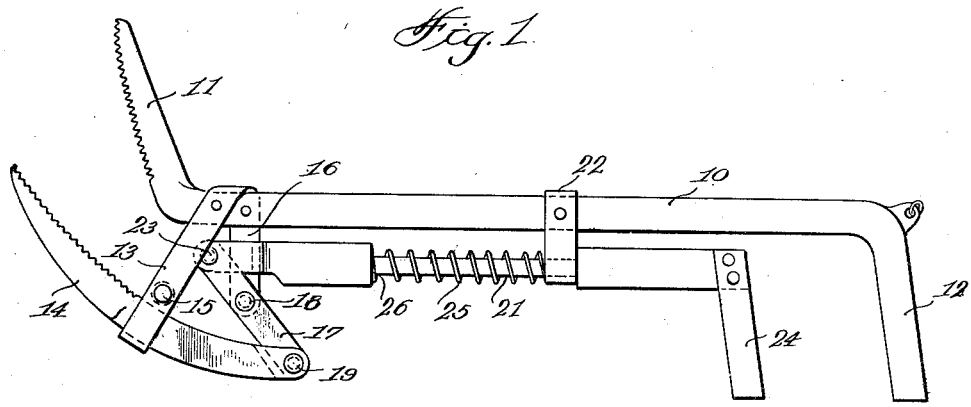
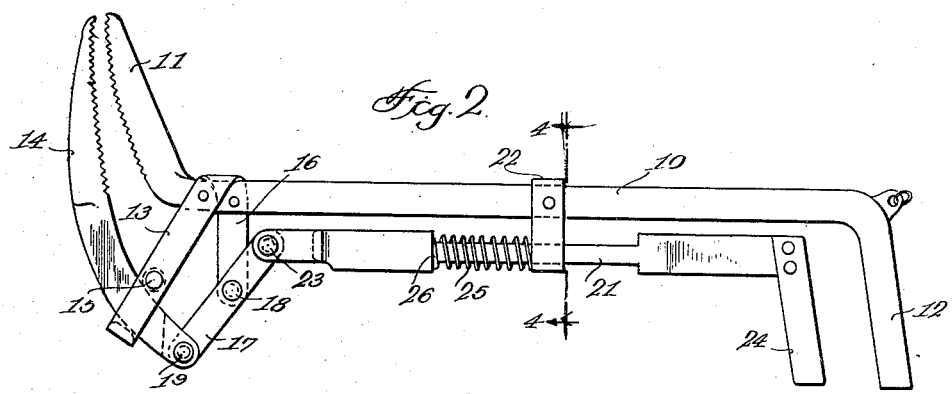
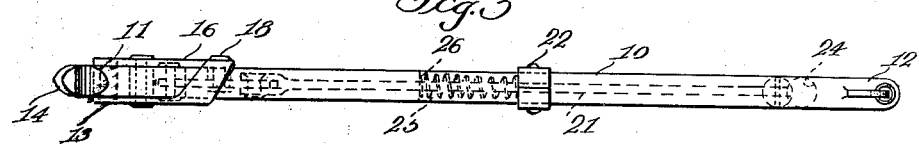
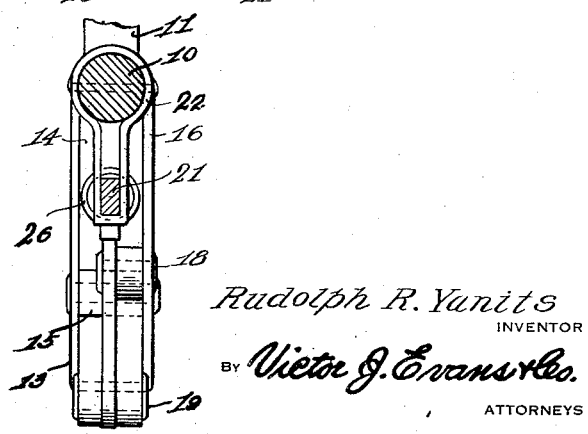
Rudolph R. Yanits
INVENTOR
BY Victor J. Evans & Co.
ATTORNEYS Patented July 25, 1939

2,167,599

UNITED STATES PATENT OFFICE 2,167,599

CAR COUPLING TOOL

Rudolph R. Yanits, Youngstown, Pa.

Application April 4, 1939, Serial No. 266,025

1 Claim. (Cl. 294—18)

This invention relates to a car coupling tool, and has for an object to provide a portable tool which can be easily operated by one hand and allow the hand to be kept at a safe distance from the coupling, when coupling or uncoupling cars.

A further object is to provide a device of this character which will be formed of a few strong, simple, and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a side elevation of the device shown in open position.

Figure 2 is a side elevation of the device shown in closed position.

Figure 3 is a top plan view of the device.

Figure 4 is a sectional view taken on lines 4—4 of Figure 2 looking in the direction of the arrows.

Referring now to the drawing in which like characters of reference designate similar parts in the various views, 10 designates an elongated shank having an upwardly and forwardly extending fixed serrated jaw 11 at the front end and a downwardly and rearwardly extending handle 12 at the rear end. A substantially U shaped guide 13 is secured to and extends downwardly and forwardly from the front end of the shank 10 and a curved movable serrated jaw 14 is slidably mounted in the guide 13. The movable jaw 14 contacts with the closed end of the guide and with a roller 15 carried by the guide.

A lug 16 extends downwardly from the shank 10 near the guide 13 and a lever 17 is pivoted as shown at 18 between its ends to the end of the lug 16. The lower end of the lever is pivotally connected as shown at 19 to the rear end of the movable jaw 14. An operating rod 21 for the movable jaw is located at the lower side of the shank and is slidably mounted in a guide 22 carried by the shank. The rod 21 is pivoted at its front end as shown at 23 to the upper end of the lever 17 and is provided at its rear end with a handle 24 which extends parallel with the shank handle 12.

A coil spring 25 is sleeved on the rod 21 between the guide 22 and a shoulder 26 formed on the rod and normally holds the movable jaw in open position with relation to the fixed jaw.

In operation the tool is easily operated by one hand. By simply grasping the handles 12 and 24 and pulling the handle 24 rearwardly the movable jaw 14 is forced upwardly between the guide 13 and roller 15 by the pivoted lever 17 so that the coupling pin may be grasped and securely held within the jaws 14 and 11. When the handle 24 is released, it is brought forwardly by the coil spring 25 into normal open position, as shown in Figure 1 and also the movable jaw 14 is returned to normal open position by the coil spring.

From the above description it is thought that the construction and operation of the invention will be fully understood without further explanation.

What is claimed is:

A car coupling tool comprising an elongated shank, an upwardly and forwardly extending fixed jaw at the front end of the shank, a downwardly and rearwardly extending handle at the rear of the shank, a guide secured to and extending downwardly and forwardly from the front end of the shank, a curved movable jaw slidably mounted in the guide, said movable jaw contacting with the closed end of the guide, a roller carried by the guide engaging the movable jaw on the opposite side thereof from the closed end of the guide, a lug extending downwardly from the shank near the guide, a lever pivoted between its ends to the lug, the lower end of the lever being pivotally connected to the rear end of the movable jaw, an operating rod for the movable jaw located at the lower side of the shank and slidably mounted in a second guide, said rod being pivoted at its front end to the upper end of the lever and being provided at its rear end with a handle disposed parallel with the shank handle, and a coil spring sleeved on the rod between the second guide and a shoulder formed on the rod and normally holding the movable jaw in open position with relation to the fixed jaw.

RUDOLPH R. YANITS.